US011715053B1

(12) United States Patent
Qazvinian et al.

(10) Patent No.: US 11,715,053 B1
(45) Date of Patent: Aug. 1, 2023

(54) DYNAMIC PREDICTION OF EMPLOYEE ATTRITION

(71) Applicant: Praisidio Inc., Menlo Park, CA (US)

(72) Inventors: Vahed Qazvinian, San Francisco, CA (US); Kenneth R. Klein, Atherton, CA (US)

(73) Assignee: Praisidio Inc., Menlo Park, CA (US)

( * ) Notice: Subject to any disclaimer, the term of this patent is extended or adjusted under 35 U.S.C. 154(b) by 0 days.

(21) Appl. No.: 17/169,286

(22) Filed: Feb. 5, 2021

Related U.S. Application Data

(60) Provisional application No. 62/979,165, filed on Feb. 20, 2020.

(51) Int. Cl.
*G06Q 10/0635* (2023.01)

(52) U.S. Cl.
CPC ................ *G06Q 10/0635* (2013.01)

(58) Field of Classification Search
CPC .................................................. G06Q 10/0635
USPC ....................................................... 705/7.28
See application file for complete search history.

(56) References Cited

U.S. PATENT DOCUMENTS

| | | | | |
|---|---|---|---|---|
| 2013/0166358 A1* | 6/2013 | Parmar | ............ | G06Q 10/06393 705/7.39 |
| 2015/0269244 A1* | 9/2015 | Qamar | ............ | G06Q 10/06398 705/7.42 |
| 2019/0197442 A1* | 6/2019 | Lu | ............ | G06Q 20/4016 |

FOREIGN PATENT DOCUMENTS

WO     WO-2021103492 A1 *  6/2021  ........... G06F 16/367

OTHER PUBLICATIONS

Alao, Analyzing Employee Attrition Using Decision Tree Algorithms, Mar. 2013, https://citeseerx.ist.psu.edu/viewdoc/download?doi=10.1.1.1012.2947&rep=rep1&type=pdf, p. 6.*

* cited by examiner

*Primary Examiner* — Mehmet Yesildag
*Assistant Examiner* — James Webb
(74) *Attorney, Agent, or Firm* — Cognition IP, P.C.; Edward Steakley; Aroon Karuna

(57) ABSTRACT

Systems and methods describe providing for the dynamic prediction of employee attrition within an enterprise organization. The systems and methods involve connecting to internal data sources within the enterprise and external data sources outside of the enterprise; receiving internal and external feed data relating to a number of entities within the enterprise, including at least one or more employees of the enterprise; converting the internal and external feed data into normalized feed data within a single format; generating enterprise graphs based on the normalized feed data, with each enterprise graph representing relationships between entities within the enterprise at a point in time; generating a risk assessment model related to changes in the enterprise graphs over time; and providing to enterprise users, based on the risk assessment model, one or more attrition probabilities for at least a subset of the employees of the enterprise.

16 Claims, 13 Drawing Sheets

600

600

DYNAMIC PREDICTION OF EMPLOYEE ATTRITION

CROSS-REFERENCE TO RELATED APPLICATIONS

This application claims the benefit of U.S. Provisional Application No. 62/979,165, filed Feb. 20, 2020, which is hereby incorporated by reference in its entirety.

FIELD

The presently described systems and methods relate generally to human capital management, and more particularly, to providing for the dynamic prediction of employee attrition within an enterprise organization.

BACKGROUND

Human capital management is a set of practices within an organization which are concerned with the recruitment, management, development, and optimization of employees as intangible, valuable assets within the organization. One of the largest components of human capital management is employee retention. In particular, voluntary employee attrition is a strain on enterprise resources, and can have a significant material impact on operations, culture, product delivery, and costs.

Traditionally, employee attrition mitigation has involved manual approaches. Often, spreadsheets are manually populated with information and edited, which is time consuming, inefficient, and prone to human error. More recently, human capital management ("HCM") systems have emerged as software solutions. Such systems may be able to collect certain sets of data relating to employee attrition and perform heuristics analysis on the data. This may be used to provide reports on employee attrition, for example. These analyses and reports tend to reflect specific snapshots in time, and they are only able to provide backward-looking reports on collected historical data. Typically, these analyses are based on a single feed of data, are not dynamic, and do not evolve based on ingestion and analysis of recent, up-to-the-minute data as it comes in.

The data used is also often limited, static, or inaccurate. For example, human attrition data used in HCM systems can include surveys which are administrated yearly, semi-yearly, or quarterly. Often, these surveys capture a snapshot in time within the company which is too infrequent to be relevant. The surveys also may be based on flawed questions and may lack specificity for particular employees or groups. Exit interviews are a popular form of data as well, and aim to provide insight into why employees have left. However, the answers to exit interviews can often be very inaccurate and misleading, due to misaligned incentives between employee and organization. Meanwhile, more informal employee conversations and team meetings, while potentially useful, are often subjective, anecdotal, and not informed by quantifiable data. It is often impossible for humans to track and make timely sense of all variations of these conversations and meetings, and insights are often elusive. Such forms of data are often no longer recent and fresh by the time they are fully digested and analyzed. This can be a major problem, as when it comes to preventing employee attrition before it occurs, meaningful insights are obtained only when the time frame to take successful preventative action has already passed.

Thus, there is a need in the field of human capital management to create a new and useful system and method for predicting employee attrition within an enterprise organization. The source of the problem, as discovered by the inventors, is a lack of relevant, quantifiable, and reliable data which can be received from multiple current sources and analyzed in a dynamic fashion.

SUMMARY

The systems and methods described herein provide for predictions of employee attrition within an enterprise. In one embodiment, the system connects to one or more internal data sources within the enterprise and one or more external data sources outside of the enterprise, receiving internal feed data from the internal data sources and external feed data from the external data sources, the internal feed data relating to a number of entities within the enterprise, including one or more employees. The system converts the internal feed data into normalized feed data within a single format, generating a plurality of enterprise graphs based on the normalized feed data. Each enterprise graph represents relationships between entities within the enterprise at a point in time. The system generates a risk assessment model related to changes in the enterprise graphs over time. The system then provides to one or more enterprise users, based on the risk assessment model, one or more attrition probabilities for at least a subset of the one or more employees of the enterprise, wherein the attrition probabilities are adjusted with respect to the external feed data.

Another embodiment relates to identifying one or more dimensions from the entities and the relationships between the entities, classifying each of the one or more dimensions into a predefined set of labels, and ranking the one or more labeled dimensions according to their effect on the attrition probability of the subset of the one or more employees.

Another embodiment relates to generating, using at least the risk assessment model and the one or more attrition probabilities, one or more explanations related to potential causes of probable employee attrition. The explanations comprise one or more suggested target actions for the enterprise to prevent or mitigate the probable attrition.

Another embodiment relates to receiving additional feed data, converting the additional feed data into additional normalized feed data, and optimizing the risk assessment model to generate one or more additional attrition probabilities based on at least the normalized feed data.

The features and components of these embodiments will be described in further detail in the description which follows. Additional features and advantages will also be set forth in the description which follows, and in part will be implicit from the description, or may be learned by the practice of the embodiments.

DETAILED DESCRIPTION

Figure 1A:
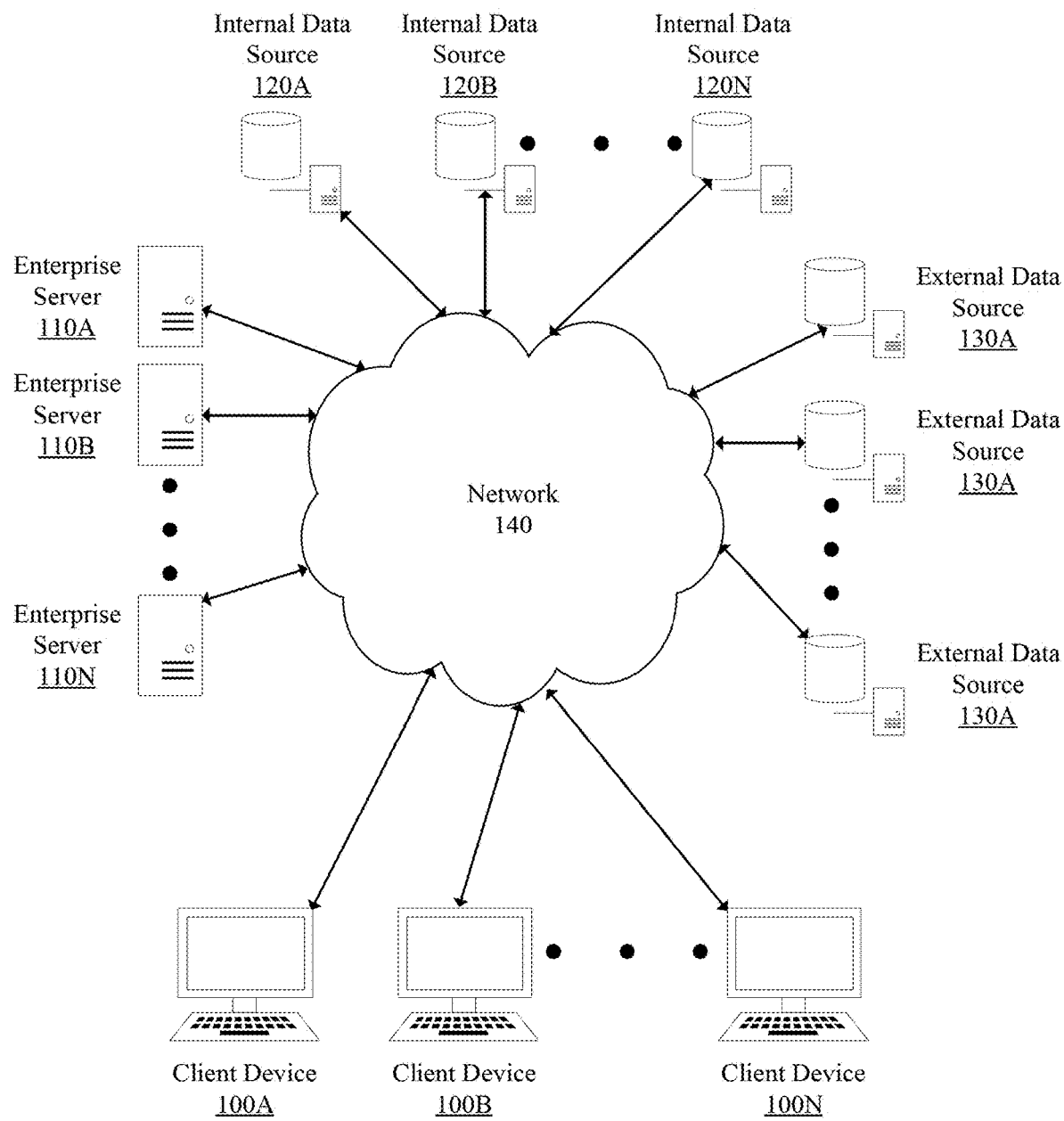
FIG. 1A is a diagram illustrating an exemplary environment in which some embodiments may operate.

In this specification, reference is made in detail to specific examples of the systems and methods. Some of the examples or their aspects are illustrated in the drawings.

For clarity in explanation, the systems and methods herein have been described with reference to specific examples, however it should be understood that the systems and methods herein are not limited to the described examples. On the contrary, the systems and methods described herein cover alternatives, modifications, and equivalents as may be included within their respective scopes as defined by any patent claims. The following examples of the systems and methods are set forth without any loss of generality to, and without imposing limitations on, the claimed systems and methods. In the following description, specific details are set forth in order to provide a thorough understanding of the systems and methods. The systems and methods may be practiced without some or all of these specific details. In addition, well known features may not have been described in detail to avoid unnecessarily obscuring the systems and methods.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

The following generally relates to the prediction and mitigation of voluntary employee attrition. The collection and normalization of daily activity feeds from multiple sources, representing the data as a time-evolving graph, may be used in the prediction of employee risk and graph evolution over time.

FIG. 1A is a diagram illustrating an exemplary environment in which some embodiments may operate. The diagram shows an example of an employee attrition prediction, explanation and mitigation platform, in accordance with some embodiments. The example shown includes client device 100A-100N, enterprise server 110A-110N, internal data source 120A-120N, external data source 130A-130N and network 140. Enterprise server 110A-110N may be an example of, or include aspects of, the corresponding element or elements described with reference to FIG. 1B.

Client devices 100A-100N are any devices that send and receive information to and from the network 140 for purposes of operating a standalone application or web-based application in a browser. In varying embodiments, client devices 100A-100N may be personal computers, personal digital assistants (PDAs), tablet computing devices, laptop computers, smart phones, e-readers, virtual reality or augmented devices, wearables, or any other suitable systems capable of operating a standalone application or web-based application in a browser.

Enterprise server 110A-110N may be any computing device capable of executing the operation of processing engine 150. Enterprise server 110A-110N may be connected through a network 140 to client devices 100A-100N, internal data sources 120A-120N and external data sources 130A-130N.

Internal data sources 120A-120N are data sources relating to data and information kept within an organization and generally not shared outside of the organization. In some embodiments, data sources and their associated feeds can fall under a number of categories. In some embodiments, such categories can include, e.g., human resources (HR), Communications, Compensation, Calendar and Task Tracking. In some embodiments, HR feeds capture employee history within the company e.g. job title change, cash compensation change, manager and location change, project history, and other associated HR data. In some embodiments, communications feeds capture communications metadata relating to which entities are communicating with whom, how often the communication occurs, and/or what the communication entails. In some embodiments, communications metadata can include, e.g., memberships in mailing lists, metadata relating to instant messaging and other conversational platforms and channels, as well as frequency and time of communication between entities. In some embodiments, communications feeds neither capture the subject line nor the content of emails or instant messages. In some embodiments, Calendar feeds capture metadata related to scheduled events and meetings, e.g., group meetings and manager one-on-one meetings. This feed helps the system understand latent networks (friends and collaborations) within the organization. In some embodiments, the system may track equity compensation through Compensation feeds. In some embodiments, task tracking feeds may collect and analyze work activity of entities by connecting to task tracking tools.

External data sources 130A-130N are data sources relating to data and information outside of an organization. In some embodiments, external data sources additionally or alternatively relate to information which is outside of the organization's ability to directly control or influence. In some embodiments, one or more external data sources may be accessed, viewed, or shared as a common source available across all customers or a subset of customers. In varying embodiments, external data can relate to sectors of industry, locations, economic or financial trends, global or regional variables, or any other suitable external data outside of an organization. In some embodiments, external data sources may include, e.g., feeds of census data such as rent, public competitor feeds such as a competitor's stock price and public sentiment indices such as employer ratings and reviews from current and former employees posted on anonymous review platforms. For example, external data sources with respect to a particular organization or entity within the organization can include or relate to the average rent of San Francisco, recent stock market crashes, an uptrend or downtrend in that organization's industry, or employee attrition rates across different cities or countries.

Some embodiments of the attrition prediction and mitigation system reduce voluntary employee attrition within an enterprise through the application of artificial intelligence, machine learning, deep learning, neural networks or combinations thereof. The system may also provide a proactive and real-time risk assessment, as well as explanations and suggested actions to mitigate attrition risk. The system may gather data passively, obviating the requirement for constant human input.

Thus, the systems and methods herein provide an end-to-end software system that may collect and normalize daily activity data feeds from multiple sources, represent the data as a time-evolving graph, and predict employee risk and graph evolution over time. The system may comprise modules to collect feed data, build enterprise graphs, generate risk assessments and provide explanations of attrition risks to a user as well as suggest actions targeted to a specific employee's circumstances. The circumstances of the employee's attrition risk may be modeled in an enterprise graph and used by a machine learning module to learn which actions are effective at mitigating attrition for employees with similar graphs.

Figure 1B:
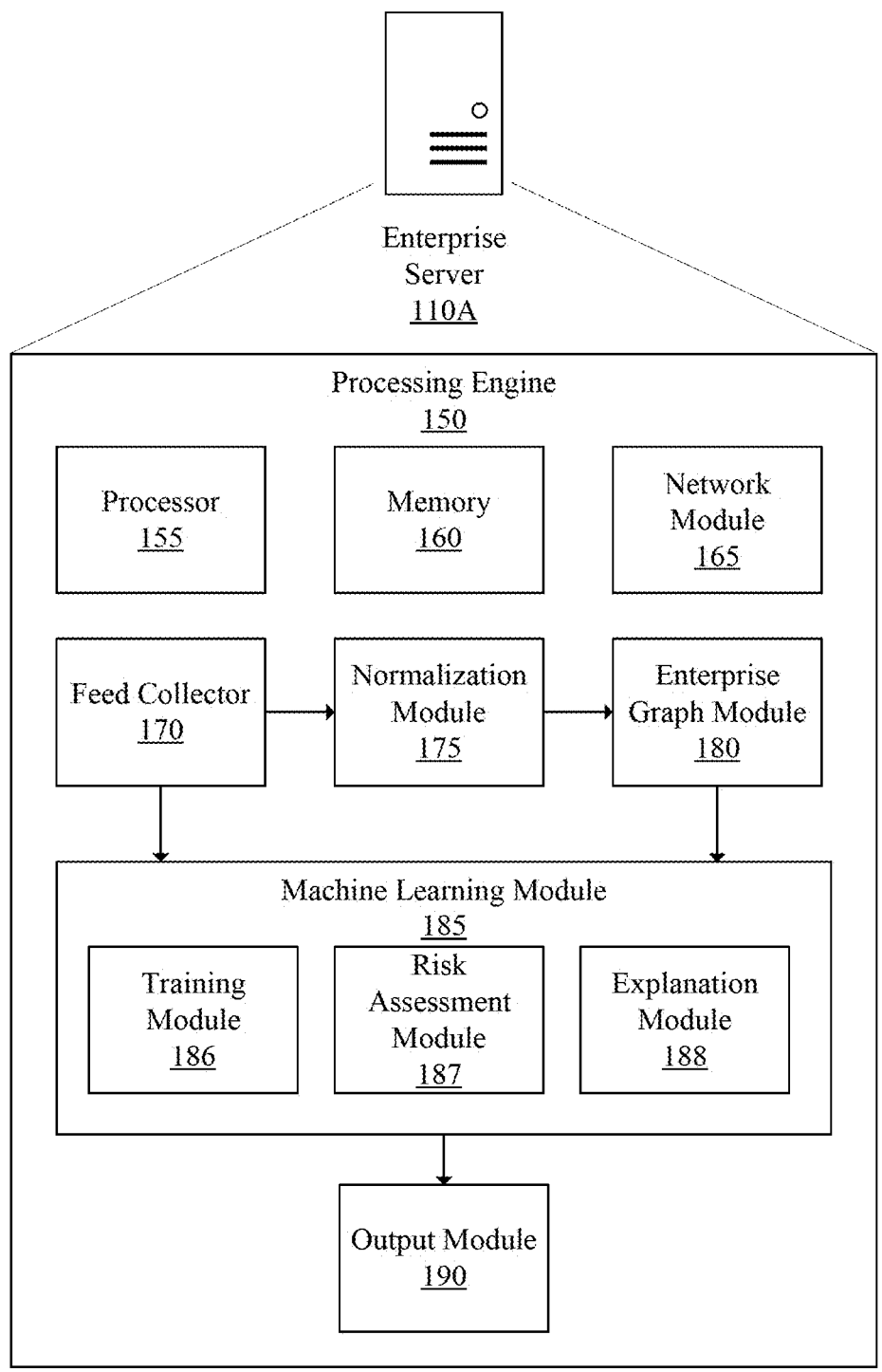
FIG. 1B is a diagram illustrating an exemplary computer system that may execute instructions to perform some of the methods therein.

FIG. 1B is a diagram illustrating an exemplary computer system that may execute instructions to perform some of the methods therein. The diagram shows an example of an attrition prediction, explanation and mitigation processing engine. Processing engine 150 may be an example of, or include aspects of, the corresponding element or elements described with reference to FIG. 1A. In some embodiments, processing engine 150 is a component or system on enterprise server 110A. In other embodiments, processing engine 150 may be a component or system on client device 100A-100N, or may be a component or system on peripherals or third-party devices. Processing engine 150 may comprise hardware or software or both.

Processing engine 150 may include processor 155, memory 160, network module 165, feed collector 170, normalization module 175, enterprise graph module 180, machine learning module 185, training module 186, risk assessment module 187, explanation module 188 and output module 190.

A processor 155 may include an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor 155 may be configured to operate a memory array using a memory controller. In other cases, a memory controller may be integrated into processor 155. The processor 155 may be configured to execute computer-readable instructions stored in a memory to perform various functions related to employee attrition prediction and mitigation, enterprise graph generation, risk assessment as well as the generation of explanations and action suggestion for specific entities such as employees.

Memory 160 may include random access memory (RAM), read-only memory (ROM), or a hard disk. The memory 160 may be solid state or a hard disk drive, and may store computer-readable, computer-executable software including instructions that, when executed, cause a processor to perform various functions described herein. In some cases, the memory 160 may contain, among other things, a BIOS which may control basic hardware or software operation such as the interaction with peripheral components or devices. In some cases, a memory controller may operate memory cells as described herein.

Network module 165 functions to transmit and receive data and receive data from other computing systems via a network. In some embodiments, the network module 165 may enable transmitting and receiving data from the Internet. Data received by the network module 165 may be used by the other modules. The modules may transmit data through the network module 165.

Feed collector 170 functions to collect data and metadata from internal and external data feeds. Data feeds may fall under a number of categories and capture data and metadata relating to information which may be pertinent to employee attrition. Feed collector may be automatically run at user specified intervals, or in response to notifications from feed sources that indicate updated information is available. Thus, the data may be passively gathered for use in employee attrition risk predictions.

Normalization module 175 functions to receive the collected data and metadata from feed collector 170. In some embodiments, the collected data and metadata may be pruned of unnecessary data by the normalization module 175. In some embodiments, normalization module 175 may also remove Personal Identifiable Information (PII) from the data in an anonymization step. The data and metadata may then be formatted and normalized into data within a single format. Normalized data may then be passed to the enterprise graph module 180 for further processing.

Enterprise graph module 180 functions to generate time-evolving graphs from the collected and normalized daily activity feeds from a plurality of sources. Enterprise graph module periodically builds enterprise graphs of entities and their relationships from the collected and normalized data. The enterprise graphs represent the enterprise at a point in time. These graphs function as modelled snapshots of the connections present between entities within the enterprise. In some embodiments, these snapshots evolve across multiple graphs over time. In some embodiments, the enterprise graphs may be stored for use in predicting the evolution of the graph at a future time. In some embodiments, in the enterprise graphs, employees may be connected to their managers and peers via work relationships. Employees may also be connected through work on specific products and/or projects. In some embodiments, employee connections to compensation, salary and/or bonuses in the enterprise graph may also be used to partly help determine attrition risk. Each node of the enterprise graph represents an employee or enterprise entity. In some embodiments, these nodes include information relating to that employee or enterprise entity, such as, e.g., location, compensation, and projects. Employee nodes in the graph have relationships with nodes representing team members, managers, projects, products, and compensation.

Machine learning module 185 functions to perform various machine learning, deep learning, and/or artificial intelligence tasks within the system. Machine learning module 185 may comprise training module 186, risk assessment module 187 and explanation module 188. The machine learning module 185 may comprise decision trees such as, e.g., classification trees, regression trees, boosted trees, bootstrap aggregated decision trees, random forests, rotation forests or a combination thereof. Additionally or alternatively, machine learning module 185 may comprise neural networks (NN) such as, artificial neural networks (ANN), autoencoders, probabilistic neural networks (PNN), time delay neural networks (TDNN), convolutional neural networks (CNN), deep stacking networks (DSN), radial basis function networks (RBFN), general regression neural networks (GRNN), deep belief networks (DBN), deep neural networks (DNN), deep reinforcement learning (DRL), recurrent neural networks (RNN), fully recurrent neural networks (FRNN), Hopfield networks, Boltzmann machines, deep Boltzmann machines, self-organizing maps (SOM), learning vector quantizations (LUQ), simple recurrent networks (SRN), reservoir computing, echo state networks (ESN), long short-term memory networks (LSTM), bi-directional RNNs, hierarchical RNNs, stochastic neural networks, genetic scale models, committee of machines (CoM), associative neural networks (ASNN), instantaneously trained neural networks (ITNN), spiking neural networks (SNN), regulatory feedback networks, neocognitron networks, compound hierarchical-deep models, deep predictive coding networks (DPCN), multilayer kernel machines (MKM), cascade correlation networks (CCN), neuro-fuzzy networks, compositional pattern-producing networks, one-shot associative memory models, hierarchical temporal memory (HTM) models, holographic associative memory (HAM), neural Turing machines, or any combination thereof. Any other suitable neural networks or other machine learning techniques may be contemplated.

A neural network is a hardware or a software component that includes a number of connected nodes (a.k.a., artificial neurons), which may be seen as loosely corresponding to the neurons in a human brain. Each connection, or edge, may transmit a signal from one node to another (like the physical synapses in a brain). When a node receives a signal, it can process the signal and then transmit the processed signal to other connected nodes. In some embodiments, the signals between nodes comprise real numbers, and the output of each node may be computed by a function of the sum of its inputs. Each node and edge may be associated with one or more node weights that determine how the signal is processed and transmitted.

During the training process, training module 186 may adjust these weights to improve the accuracy of the result (e.g., by minimizing a loss function which corresponds in some way to the difference between the current result and the target result). The weight of an edge may increase or decrease the strength of the signal transmitted between nodes. In some embodiments, nodes may have a threshold below which a signal is not transmitted at all. The nodes may also be aggregated into layers. Different layers may perform different transformations on their inputs. In some embodiments, the initial layer is the input layer and the last layer is the output layer. In some cases, signals may traverse certain layers multiple times.

Risk assessment module 187 functions to model the changes in the enterprise graph over time. In some embodiments, risk assessment module 187 may employ a machine learning model, such as a deep learning model, deep belief network, artificial neural network, or any of the aforementioned neural networks. In some embodiments, current graphs may be compared with representations of historical data to detect, assess, prioritize, alert, explain, and suggest timely actions with workflows to reduce voluntary employee attrition. In some embodiments, connections between entity nodes may be weighted based on strength of the ties between the entities. In some embodiments, stronger ties between nodes indicate a lower attrition risk, and weaker ties or newly broken ties indicate an elevated attrition risk. In some embodiments, observations of changes to the strength of ties between entity nodes as well as broken ties between entity nodes are made over time. These observations may provide insight into an employee's attrition risk at the current time or at a future time by predicting the attrition risk based on data trends.

In some embodiments, machine learning module 185 and/or risk assessment module 187 may additionally or alternatively combine external feeds with the enterprise graph sequences to build the input used by the machine learning module 185 and/or risk assessment module 187. External feeds relate to information and data which are external to the organization, and which are not directly controllable or manipulable by the organization. In some embodiments, at least a subset of the information and data from external feeds are shared among and/or accessible by multiple organizations within the system. In varying embodiments, external feeds may comprise census data such as rent, public competitor feeds such as a competitor's stock price and public sentiment indices such as employer ratings and reviews from current and former employees posted on anonymous review platforms. In some embodiments, risk assessment module 187 may observe changes in enterprise relationships, consisting of many weak signals over time, and benefit from external feeds to create a strong risk signal which affects employee risk prioritization. In some embodiments, the risk assessment module 187 may combine a series of sequence inputs (pay change, team change, etc.) with a number of categorical inputs (such as current public sentiment, industry, employee gender, etc.) in the generation of the attrition risk model. In some embodiments, the attrition risk model may be used to generate specific predictions in terms of which employee is at an increased attrition risk as well as when the attrition risk will occur. In some embodiments, predictions may be given priority when attrition risk reaches a specified threshold. In some embodiments, the threshold may be a predetermined threshold and/or a dynamically calculated threshold relative to the attrition risk levels of other employees.

In some embodiments, risk assessment module 187 may also generate intermediate attrition risk models for groups of entities within an enterprise environment. In varying embodiments, these groups may be clustered together based on, e.g., gender, project assignments, department, work group, office location, supervisor, and/or any other suitable risk factor or sets of risk factors associated with employee entities. Inputs to the model that may be result in higher risk factors may include, e.g., an employee's bonus, equity, salary, merit based raise, relative salary verses other employees, time since last raise or promotion, and/or any other suitable inputs. In some embodiments, attrition risk models for the intermediate clusters of employees (such as, e.g., women, high potential employees, and/or employees on critical projects) may be useful in retaining employees that are integral to high revenue projects and to the diversity of the workplace. In some embodiments, attrition risk models may be used to identify systemic problems in a work environment, such as sexism and racism. A disproportionately higher attrition probability for a minority group may bring to light underlying problems with projects, or managers that should be remedied to minimize the employer's liability.

Explanation module 188 functions to provide actionable, human-understandable explanations for attrition risk. In some embodiments, the explanations may be ranked or sorted by priority of the attrition risk. In some embodiments, explanation module 188 provides the attrition risk model with input examples based on training data. In some embodiments, the explanations are first extracted in terms of high-dimensional features, and then projected on to a low-dimensional space categorized into groups such as, e.g., connection, contribution, career, and context. In varying embodiments, a connection group represents the relationships within the company including, e.g., relationships with managers, the leadership team, peers, and friends. The contribution group represents how an employee is valued by the company in quantitative terms such as, e.g., salary, bonus, promotion, reviews, and ranking. The career risk group identifies employees who are showing symptoms of likely attrition, such as, e.g., symptoms of stagnating, being overstimulated, or being burned out. Employees who are stimulated at the right amount and are experiencing job growth may signify a lower career risk. The context group may generally be composed of external signals such as, e.g., reputation, cultural health, and life stage events such as a having a baby.

In some embodiments, explanation module 188 may also generate entity "stories" or time-based narratives that visually represent an employee's timeline and lifecycle. These stories may display important milestone achievements or major changes across multiple snapshots of an employee's graphs. In some embodiments, significant changes between one timestamp to the next, with respect to the nodes of the employee graph, may trigger an alert notifying a user of the system that an employee is at risk for voluntary attrition. In some embodiments, the explanation module 188 determines which employees are at the highest attrition risk and prioritizes the attrition mitigation efforts to these employees. In some embodiments, the explanation module 188 may also determine which risk factors are of the highest importance by analyzing the risk factors of previous employees that separated from employment at the organization. Previous employees may have multiple risk factors that result in voluntary attrition, and a union set of all the risk factors responsible for the employee attritions may be used to calculate the voluntary attrition risk of the specific employee being analyzed. If any of the most common risks occur for an individual employee, the employee may be flagged as being of high risk for attrition.

In some embodiments, the magnitude of changes to a graph between snapshots may not be used. In some embodiments, meaningful changes to the graph may be small, but unexpected or of high importance. Minor risks and minor changes may be part of the graph, or filtered and/or ignored if they do not meet or exceed a threshold of importance or relevance. Gaps in minor risks may be important. This may depend on when and how often they occur. The gaps in minor risks may impact the risk factor by a larger amount than what the minor risk would normally impart. Minor risks that appear frequently may not be a sign of high overall risk. However, minor risks that are not expected or do not normally appear may be a sign of a significant change. Minor risks that appear at a particular frequency may also be significant if there is a large change in that frequency between snapshots. The change may be to a more frequent appearance or less frequent appearance. In some embodiments, explanation module 188 additionally or alternatively generates a summary of risky events and non-risky events that occur between snapshots of an employee graph.

Output module 190 functions to generate one or more user interfaces for the display and visual representation of employee attrition risk. In some embodiments, output module 190 provides one or more dashboards which allow a user to select information to be displayed and/or to interact with data visualizations. In some embodiments, the dashboards import risk assessments from the risk assessment module 187 and explanation models from the explanation module 188, and periodically show a new list of employees (or groups of employees whom are grouped by, e.g. location, cohort, gender, etc.) who are at high risk of attrition. In some embodiments, the dashboards provide employers with options to provide feedback, take action, and/or monitor progress on their actions to mitigate employee attrition risk. The targeted actions and their effects (e.g., pay raise, project change, etc.) may then be used as inputs within a closed loop feed by the machine learning module 185, risk assessment module 187 and/or explanation module 188.

Figure 2A:
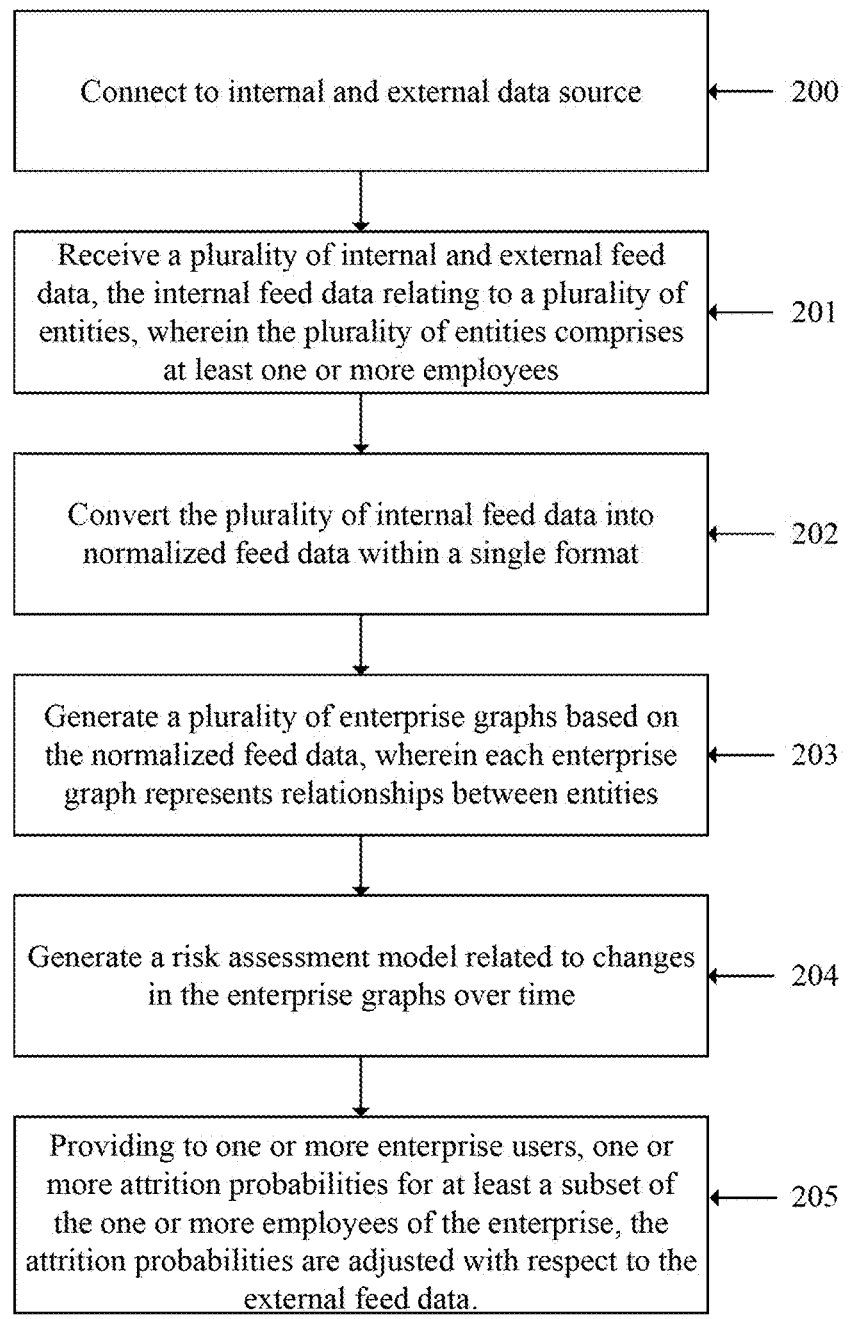
FIG. 2A is a flow chart illustrating an exemplary method that may be performed in accordance with some embodiments.

FIG. 2A is a flow chart illustrating an exemplary method that may be performed in accordance with some embodiments. The flow chart shows an example of a process for predicting employee attrition within an enterprise environment. In some examples, these operations may be performed by a system including a processor executing a set of codes to control functional elements of an apparatus. Additionally or alternatively, the processes may be performed using special-purpose hardware. Generally, these operations may be performed in accordance with some aspects of the systems and methods herein. For example, the operations may be composed of various substeps, or may be performed in conjunction with other operations described herein.

At step 200, the system connects to internal and external data sources. In some embodiments, the operations of this step may refer to, or be performed by, a client device or enterprise server as described with reference to FIG. 1A or modules with processing engine 150 as described with reference to FIG. 1B. For example, processing engine 150 may reside on enterprise server 110A. In some embodiments, network module 165 may be used by processing engine 150 to communicate with internal data sources 120A-120N and external data sources 130A-130N via network 140.

At step 201, the system receives a plurality of internal and external feed data, the internal feed data relating to a plurality of entities, wherein the plurality of entities comprises at least one or more employees. In some embodiments, the operations of this step may refer to, or be performed by, a feed collector 170 as described with reference to FIG. 1B.

At step 202, the system converts the plurality of internal feed data into normalized feed data within a single format. In some cases, the operations of this step may refer to, or be performed by, a normalization module 175 as described with reference to FIG. 1B.

At step 203, the system generates a plurality of enterprise graphs based on the normalized feed data, wherein each enterprise graph represents relationships between entities. In some cases, the operations of this step may refer to, or be performed by, an enterprise graph module 180 as described with reference to FIG. 1B.

At step 204, the system generates a risk assessment model related to changes in the enterprise graphs over time. In some cases, the operations of this step may refer to, or be performed by, a risk assessment module 187 as described with reference to FIG. 1B.

At step 205, the system provides to one or more enterprise users, based on the risk assessment model, one or more attrition probabilities for at least a subset of the one or more employees of the enterprise. The attrition probabilities are adjusted with respect to the external feed data. In some cases, the operations of this step may refer to, or be performed by, machine learning module 185, risk assessment module 187, explanation module 188 and output module 190 as described with reference to FIG. 1B.

Figure 2B:
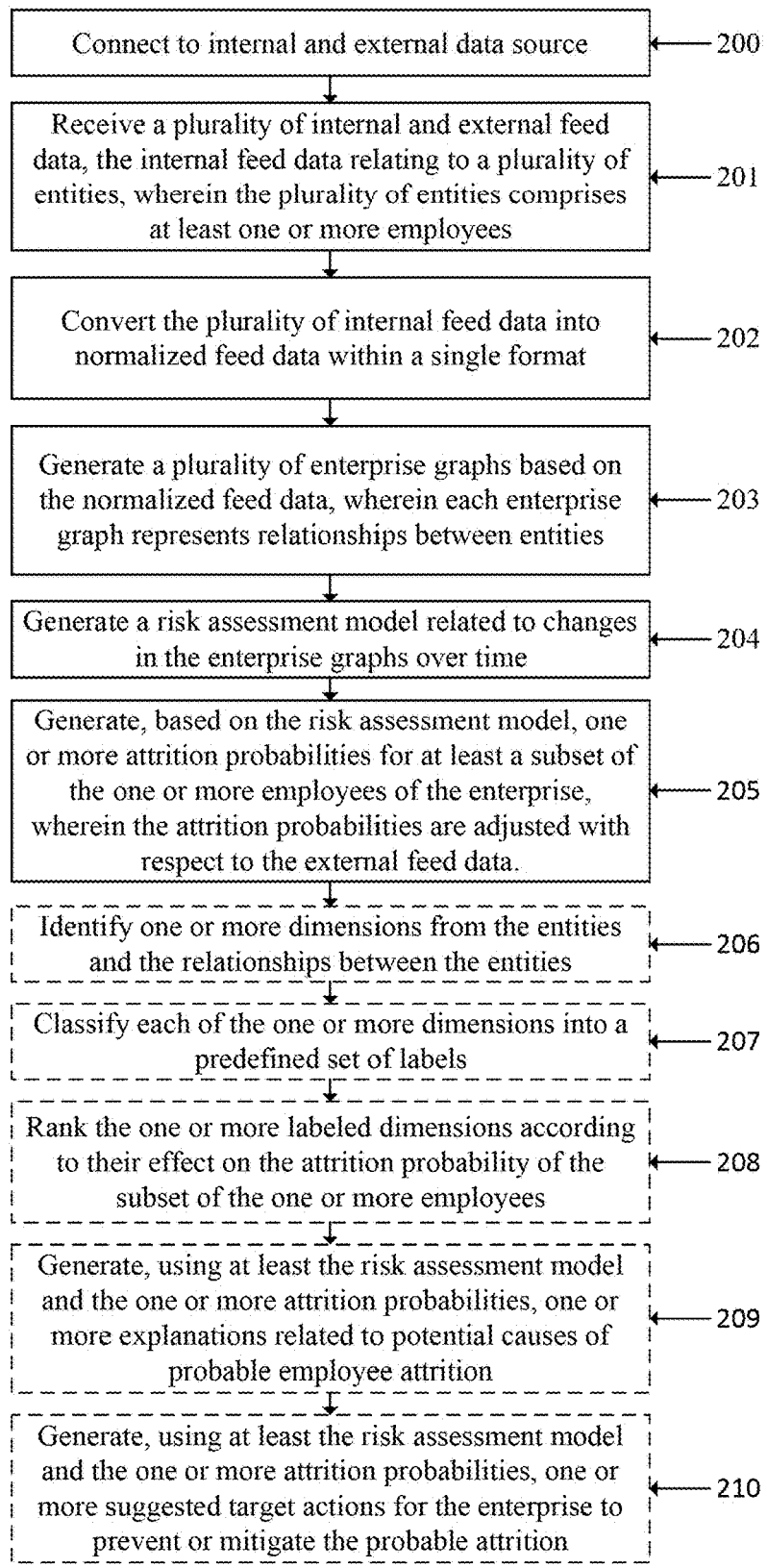
FIG. 2B is a flow chart illustrating additional steps that may be performed in accordance with some embodiments.

FIG. 2B is a flow chart illustrating additional steps that may be performed in accordance with some embodiments. The flow chart shows an example of a process for predicting employee attrition and generating explanation and action suggestions to mitigate employee attrition within an enterprise environment. In some embodiments, these operations may be performed by a system including a processor executing a set of codes to control functional elements of an apparatus. Additionally or alternatively, the processes may be performed using special-purpose hardware. Generally, these operations may be performed in accordance with some aspects of the systems and methods herein. For example, the operations may be composed of various substeps, or may be performed in conjunction with other operations described herein.

At step 200, the system connects to internal and external data sources. In some embodiments, the operations of this step may refer to, or be performed by, a client device or enterprise server as described with reference to FIG. 1A or modules with processing engine 150 as described with reference to FIG. 1B. For example, process engine 150 may reside on enterprise server 110A. Network module 165 may be used by process engine 150 to communicate with internal data sources 120A-120N and external data sources 130A-130N via network 140.

At step 201, the system receives a plurality of internal and external feed data, the internal feed data relating to a plurality of entities, wherein the plurality of entities comprises at least one or more employees. In some cases, the operations of this step may refer to, or be performed by, a feed collector 170 as described with reference to FIG. 1B.

At step 202, the system converts the plurality of internal feed data into normalized feed data within a single format. In some cases, the operations of this step may refer to, or be performed by, a normalization module 175 as described with reference to FIG. 1B.

At step 203, the system generates a plurality of enterprise graphs based on the normalized feed data, wherein each enterprise graph represents relationships between entities. In some cases, the operations of this step may refer to, or be performed by, an enterprise graph module 180 as described with reference to FIG. 1B.

At step 204, the system generates a risk assessment model related to changes in the enterprise graphs over time. In some cases, the operations of this step may refer to, or be performed by, a risk assessment module 187 as described with reference to FIG. 1B.

At step 205, the system generates, based on the risk assessment model, one or more attrition probabilities for at least a subset of the one or more employees of the enterprise. In some embodiments, the attrition probabilities are adjusted with respect to the external feed data. In some cases, the operations of this step may refer to, or be performed by, machine learning module 185, risk assessment module 187, explanation module 188 and output module 190 as described with reference to FIG. 1B.

At step 206, the system identifies one or more dimensions from the entities and the relationships between the entities. In some cases, the operations of this step may refer to, or be performed by, machine learning module 185, risk assessment module 187 and explanation module 188 as described with reference to FIG. 1B.

At step 207, the system classifies each of the one or more dimensions into a predefined set of labels. In some cases, the operations of this step may refer to, or be performed by, machine learning module 185, risk assessment module 187 and explanation module 188 as described with reference to FIG. 1B.

At step 208, the system ranks the one or more labeled dimensions according to their effect on the attrition probability of the subset of the one or more employees. In some cases, the operations of this step may refer to, or be performed by, machine learning module 185, risk assessment module 187 and explanation module 188 as described with reference to FIG. 1B.

At step 209, the system generates, using at least the risk assessment model and the one or more attrition probabilities, one or more explanations related to potential causes of probable employee attrition. In some cases, the operations of this step may refer to, or be performed by, machine learning module 185, risk assessment module 187 and explanation module 188 as described with reference to FIG. 1B.

At step 210, the system generates, using at least the risk assessment model and the one or more attrition probabilities, one or more suggested target actions for the enterprise to prevent or mitigate the probable attrition. In some cases, the operations of this step may refer to, or be performed by, machine learning module 185, risk assessment module 187 and explanation module 188 as described with reference to FIG. 1B.

Figure 2C:
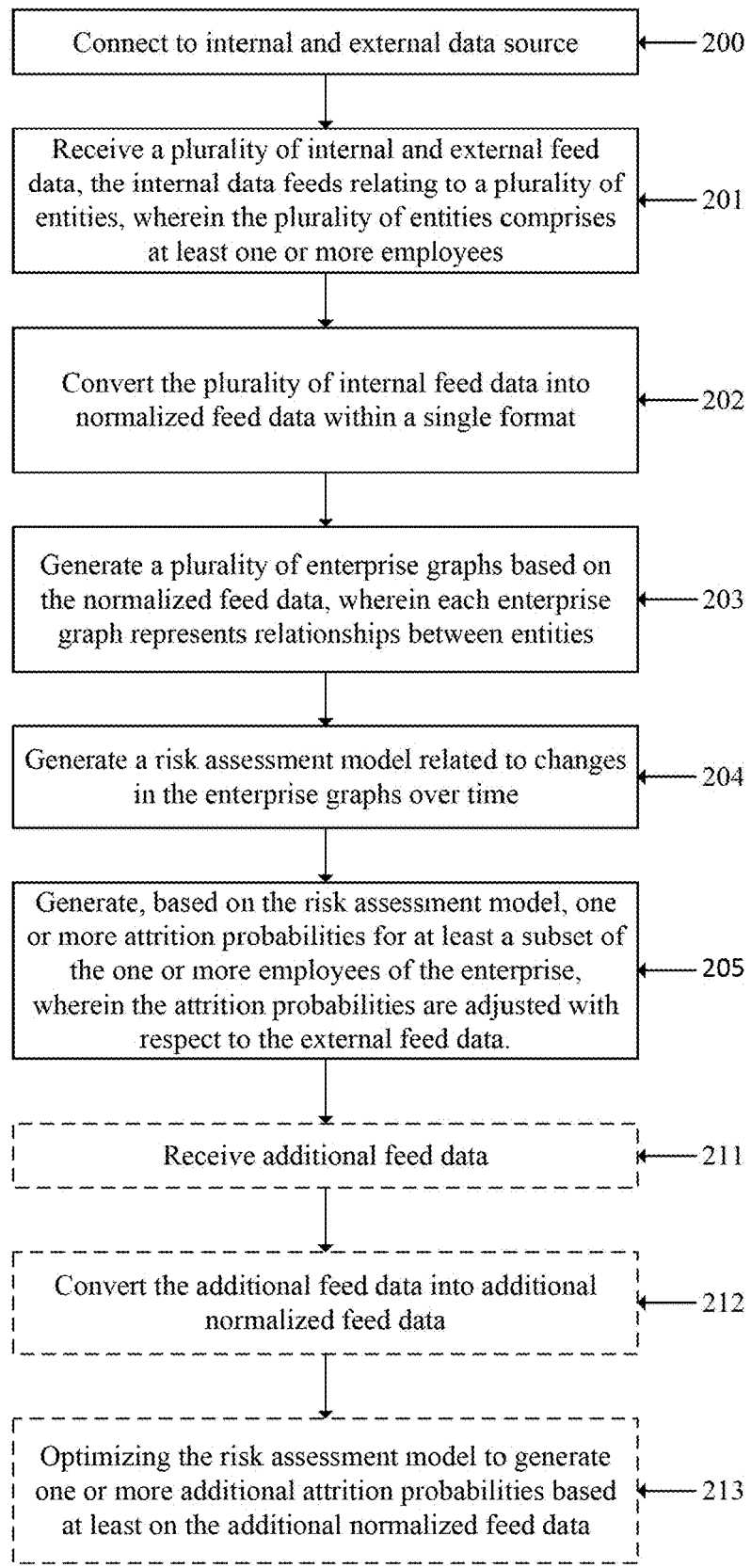
FIG. 2C is a flow chart illustrating additional steps that may be performed in accordance with some embodiments.

FIG. 2C is a flow chart illustrating additional steps that may be performed in accordance with some embodiments. The flow chart shows an example of a process for predicting employee attrition and optimizing risk assessment models through the use of additional feed data. In some embodiments, these operations may be performed by a system including a processor executing a set of codes to control functional elements of an apparatus. Additionally or alternatively, the processes may be performed using special-purpose hardware. Generally, these operations may be performed in accordance with some aspects of the systems and methods herein. For example, the operations may be composed of various substeps, or may be performed in conjunction with other operations described herein.

At step 200, the system connects to internal and external data sources. In some embodiments, the operations of this step may refer to, or be performed by, a client device or enterprise server as described with reference to FIG. 1A or modules with processing engine 150 as described with reference to FIG. 1B. For example, process engine 150 may reside on enterprise server 110A. Network module 165 may be used by process engine 150 to communicate with internal data sources 120A-120N and external data sources 130A-130N via network 140.

At step 201, the system receives a plurality of internal and external feed data, the internal feed data relating to a plurality of entities, wherein the plurality of entities comprises at least one or more employees. In some cases, the operations of this step may refer to, or be performed by, a feed collector 170 as described with reference to FIG. 1B.

At step 202, the system converts the plurality of internal feed data into normalized feed data within a single format. In some cases, the operations of this step may refer to, or be performed by, a normalization module 175 as described with reference to FIG. 1B.

At step 203, the system generates a plurality of enterprise graphs based on the normalized feed data, wherein each enterprise graph represents relationships between entities. In some cases, the operations of this step may refer to, or be performed by, an enterprise graph module 180 as described with reference to FIG. 1B.

At step 204, the system generates a risk assessment model related to changes in the enterprise graphs over time. In some cases, the operations of this step may refer to, or be performed by, a risk assessment module 187 as described with reference to FIG. 1B.

At step 205, the system generates, based on the risk assessment model, one or more attrition probabilities for at least a subset of the one or more employees of the enterprise. In some embodiments, the attrition probabilities are adjusted with respect to the external feed data. In some cases, the operations of this step may refer to, or be performed by, machine learning module 185, risk assessment module 187, explanation module 188 and output module 190 as described with reference to FIG. 1B.

At step 211, the system receives additional feed data. In some cases, the operations of this step may refer to, or be performed by, feed collector 170 as described with reference to FIG. 1B and/or external feed 325 as described with reference to FIG. 3.

At step 212, the system converts the additional feed data into additional normalized feed data. In some cases, the operations of this step may refer to, or be performed by, normalization module 175, machine learning module 185, risk assessment module 187 or explanation module 188 as described with reference to FIG. 1B and/or external feed 325, optimization module 330 or explanation module 335 as described with reference to FIG. 3.

At step 213, the system optimizes the risk assessment model to generate one or more additional attrition probabilities based at least on the additional normalized feed data. In some cases, the operations of this step may refer to, or be performed by, machine learning module 185 or risk assessment module 187 as described with reference to FIG. 1B and/or optimization module 330 as described with reference to FIG. 3.

Figure 3:
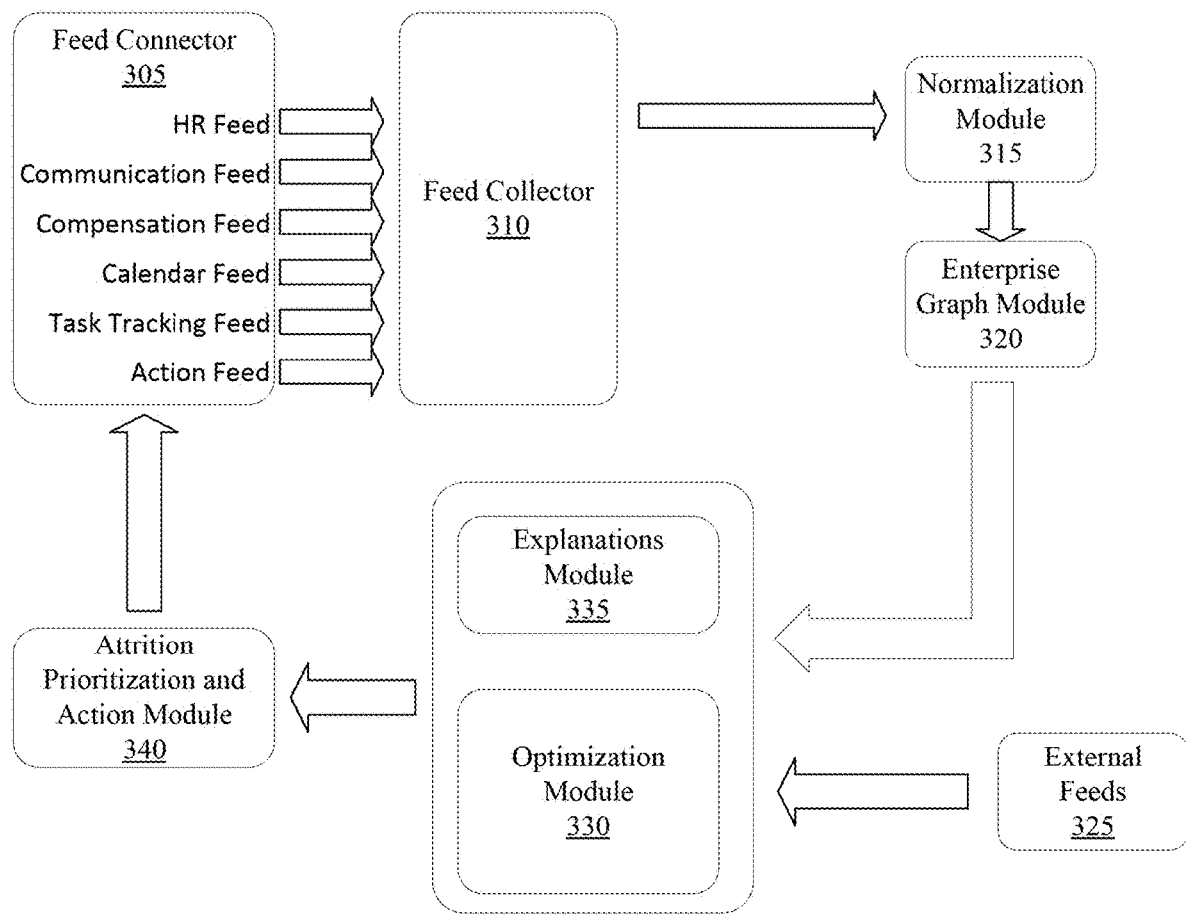
FIG. 3 is a flow chart illustrating an example embodiment of a method for providing a platform for prediction employee attrition and generating explanations for the predictions, in accordance with some aspects of the systems and methods herein.

FIG. 3 is a flow chart illustrating an example embodiment of a method for providing a platform for predicting employee attrition and generating explanations for the predictions, in accordance with some aspects of the systems and methods herein. The attrition prioritization platform 300 may include feed connector 305, feed collector 310, normalization module 315, enterprise graph module 320, external feeds 325, optimization module 330, explanation module 335, and attrition prioritization and action module 340.

Feed connector 305 may connect to internal feed sources such as 110A-110N as well as attrition prioritization and action module 340 data from optimization module 330 and/or explanation module 335. Internal data feeds help refine risk at a granular employee level. Data feeds may fall under a number of categories such as, e.g., HR, Communications, Compensation, Calendar and Task Tracking, as previously described. Feed connector 305 may periodically connect to internal feeds and the output of the machine learning module 185, risk assessment module 187 and/or explanation module 188. In varying embodiments, the connections may be initiated automatically, at user specified intervals, or in response to notifications from feed sources that indicate updated information is available.

In some embodiments, feed collector 310 may be run periodically to aggregate data from feeds connected to feed connector 305. The newly aggregated data may then be combined and passed to the normalization module 315.

Normalization module 315 functions to remove any unnecessary parts from the aggregated feed data and convert/format the aggregated data into a single normalized format. In some embodiments, normalization module 315 may additionally strip Personal Identifiable Information (PII) from the feed data to preserve employee anonymity. In some embodiments, internal feed data may be normalized within an organization. In some embodiments, events, such as which employee is performing a task at a particular time (e.g., via timestamps), and relationships between employees and entities within the company, may be normalized prior to generation of the enterprise graphs. Anonymized and normalized data is then passed to the enterprise graph module 320.

Enterprise graph module 320 functions to read the normalized data passed from the normalization module and build a graph that represents the enterprise entity relationship in graph format. In some embodiments, enterprise graph module 320 can be configured to generate a graph on a predefined periodic or semi-periodic basis, such as, e.g., on a daily, weekly, or monthly basis. The system may maintain a list of historical graphs for each enterprise entity.

External feeds 325 relate to information and data which are external to the organization, and which are not directly controllable or manipulable by the organization. In some embodiments, at least a subset of the information and data from external feeds are shared among and/or accessible by multiple organizations within the system. In varying embodiments, the external feeds 325 may comprise census data such as rent, public competitor feeds such as a competitor's stock price and public sentiment indices such as employer ratings and reviews from current and former employee posted on anonymous review platforms. In some embodiments, the external feeds 325 may be incorporated into the enterprise graph sequence, creating a strong risk signal to affect employee risk prioritization. In some embodiments, the combined external feeds 325 and enterprise graph sequences may then be input to the machine learning models, optimization module 330 and explanation module 335.

In some embodiments, the external feeds 325, may alternately be injected into the risk assessment model or attrition probability output generated by the machine learning module, optimization module 330 or explanation module 335. The adjusted attrition probability may take into account external feeds 325 that represent various external factors such as, e.g., positive sentiment, comparisons between companies, models of sectors of industry, locations, stock market performance (e.g., crashes or recessions), layoffs, job market statistics, any other suitable external factors or external inputs, or any combination thereof. In some embodiments, the external feeds are used to calibrate the attrition probability of the entire organization or a subset of the organization. In some embodiments, different attrition profiles may be used in different situations. Such profiles may include profiles for specific cities, countries or industries.

Optimization module 330 functions to receive the combined external feeds 325 and enterprise graph sequences and observe the changes in enterprise relationships, consisting of many weak signals, over time. The optimization module may combine a series of sequence inputs (pay change, team change, etc.) with a number of categorical inputs (such as current public sentiment, industry, employee gender, etc.) to generate an attrition risk model.

Explanation module 335 functions to functions to provide actionable, human-understandable explanations for attrition risk. In some embodiments, the explanations may be ranked or sorted by priority of the attrition risk. In some embodiments, explanation module 188 provides the attrition risk model with input examples based on training data. Further aspects of explanations are described above. In some embodiments, the explanation module 335 may provide actionable explanation and the associated priority of each explanation. In some embodiments, the explanation module 335 may additionally provide a detailed reason for the attrition.

Attrition prioritization and action module 340 functions to provide prioritized attrition and action information. In some embodiments, attrition prioritization and action module 340 may periodically show a new list of employees (or groups of employees by location, cohort, gender, etc.) who are at high risk of attrition. In some embodiments, the employer may be given the functionality to provide feedback, take actions, and monitor progress on their actions to mitigate employee attrition risk. In some embodiments, the targeted actions and their effects (e.g., pay raise, project change, etc.) may then be used as inputs to a closed loop feed by the feed connector 305, optimization module 330 and/or explanation module 335.

Figure 4:
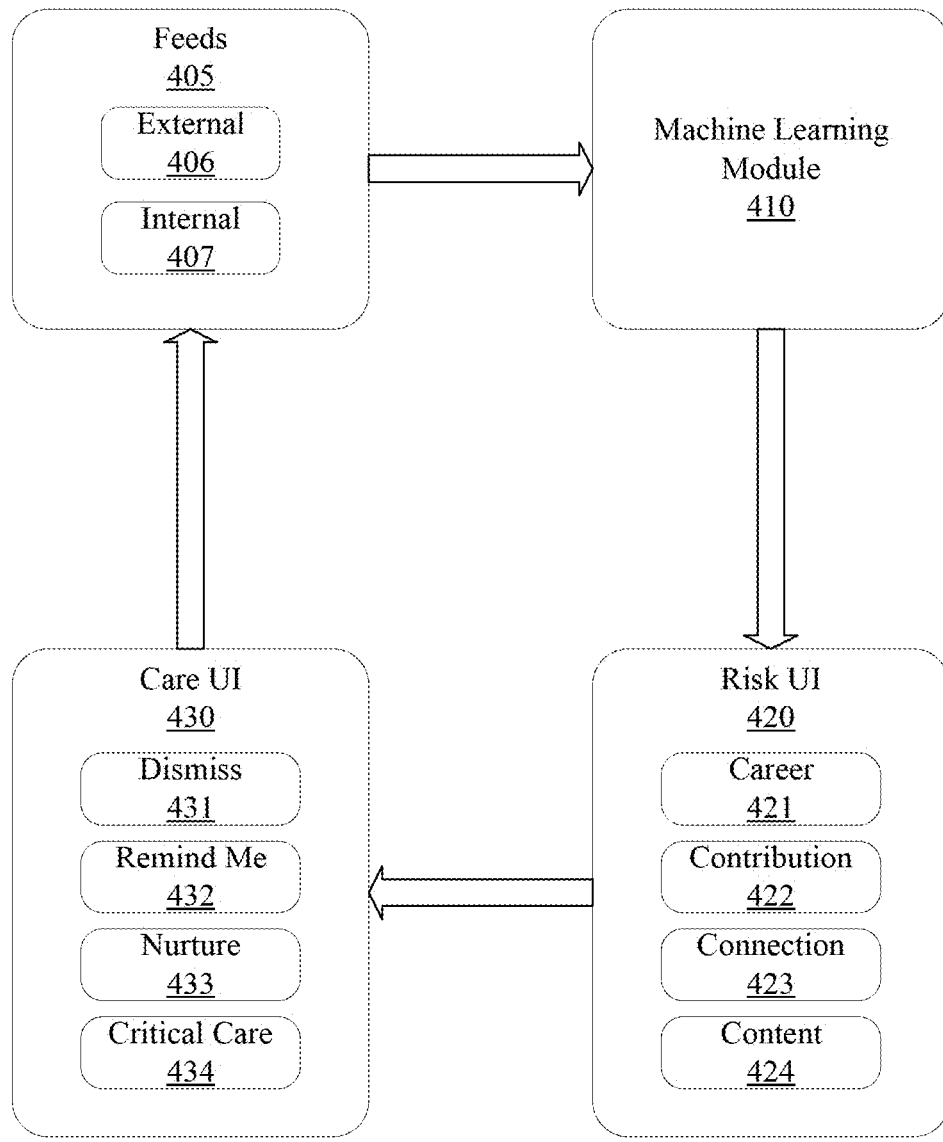
FIG. 4 is a flow chart illustrating an example embodiment of an employee attrition prediction platform with one or more integrated user interfaces, in accordance with some aspects of the systems and methods herein.

FIG. 4 is a flow chart illustrating an example embodiment of an employee attrition prediction platform with one or more integrated user interfaces, in accordance with some aspects of the systems and methods herein. Employee attrition prediction platform 400 may include feeds 405, external feeds 406, internal feeds 407, machine learning module 410, risk UI module 420, risk factor modules for career 421, contribution 422, connection 423 and content 424, and a care UI module 430 comprising interface functionalities dismiss 431, remind me 432, nurture 433 and critical care 434.

Feeds 405 may comprise external feeds 406 and internal feeds 407, as described above.

Machine learning module 410 functions to perform various machine learning, deep learning, and/or artificial intelligence tasks within the system, and in some embodiments may comprise training modules, risk assessment modules and explanation modules, as described with respect to machine learning module 185 and associated modules in FIG. 1B.

Risk UI module 420 may comprise risk factor modules for career risk 421, contribution risk 422, connection risk 423 and content risk 424. In some embodiments, the Risk UI module may comprise one or more dashboards that display information and data visualizations relating to the risk factor modules. The details of Risk UI module 420's features are described in further detail above.

Care UI 430 comprises one or more dashboards further comprising dismiss interface 431, remind me interface 432, nurture interface 433 and critical care interface 434.

Dismiss interface 431 provides the employer with an option to ignore an alert or notification of an employee with an elevated attrition risk.

Remind me interface 432 provides the employer with an option to temporarily ignore an alert or notification of an employee with an elevated attrition risk. In some embodiments, the employer may customize a threshold of attrition risk at which an additional alert or notification will be displayed to the employer. The remind me interface 432 may also allow the employer to set a specific date and time to be reminded of the attrition risk. The remind me interface 432 may also generate a reminder of the attrition risk at predefined time intervals.

Nurture interface 433 provides an employer with optional actions that may be taken to mitigate attrition risk. Actions may be listed in a prioritized order. One or more actions may be selected, and the actions may be triggered/performed in parallel or in a sequential order.

Critical care interface 434 displays information associated with employees with the highest risk of attrition, high potential employee, and employees on critical projects. In some embodiments, additional actions and suggestions may be displayed for these employees that are not available under the nurture interface 433. Alternatively, the same actions and suggestions may be displayed under both nurture interface 433 and critical care interface 434, while allowing for the actions to carry a higher priority for the critical care interface 434 selections.

Figure 5A:
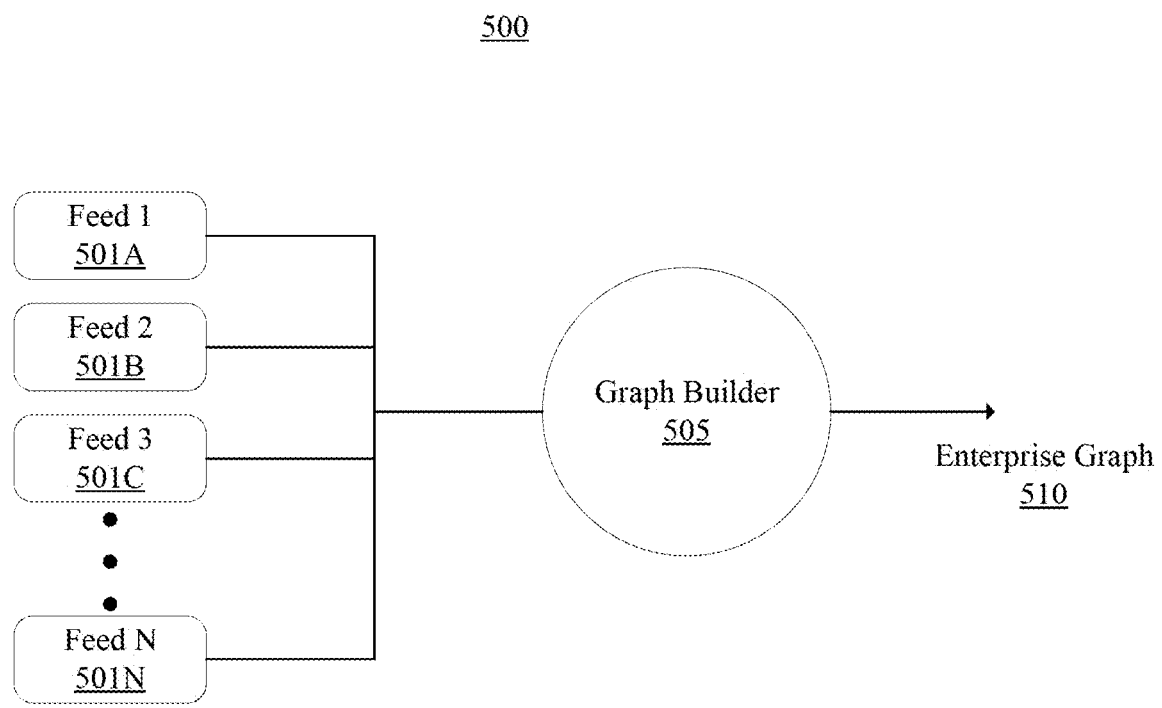
FIG. 5A is a diagram illustrating an example embodiment of an enterprise graph builder, in accordance with some aspects of the systems and methods herein.
Figure 5B:
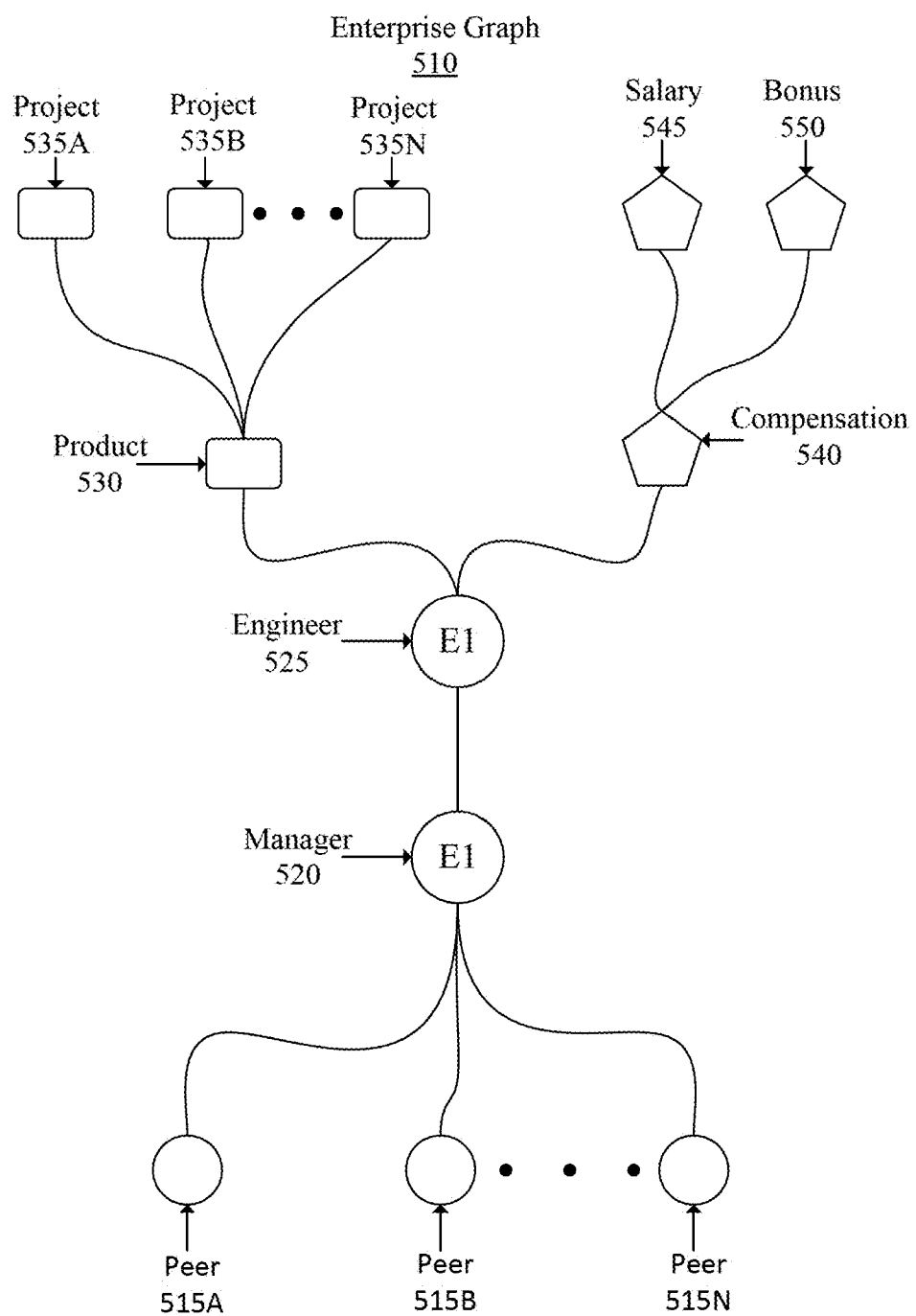
FIG. 5B is a diagram illustrating an example embodiment of an enterprise graph that is created for a time period, in accordance with some aspects of the systems and methods herein.

FIG. 5A is a diagram illustrating an example embodiment of an enterprise graph builder 500, in accordance with some aspects of the systems and methods herein. FIG. 5B is a diagram illustrating an example embodiment of an enterprise graph 510 that is created for a time period, in accordance with some aspects of the systems and methods herein. Enterprise graph builder 500 may comprise feeds 501A-501N, graph builder 505 and enterprise graph 510.

Feeds 501A-501N may be internal or external feeds. Feeds 501A-501N may fall under a number of categories such as HR, Communications, Compensation, Calendar and Task Tracking, as described above. These feeds may be aggregated, normalized, anonymized and passed to graph builder 505.

Graph builder 505 functions to build time-evolving graphs from the aggregated, normalized and/or anonymized feeds. Graph builder 505 periodically builds enterprise graphs of entities and their relationships from the collected and normalized data. The enterprise graphs represent the enterprise at a point in time. These graphs are snapshots of the connections present between entities within the enterprise and evolve over time. Enterprise graph generation is described in further detail above.

Enterprise graph 510 may comprise entities such as, e.g., peers 515A-515N, manager 520, engineer 525, product 530, projects 535A-535N, compensation 540, salary 545 and bonus 550.

Figure 6A:
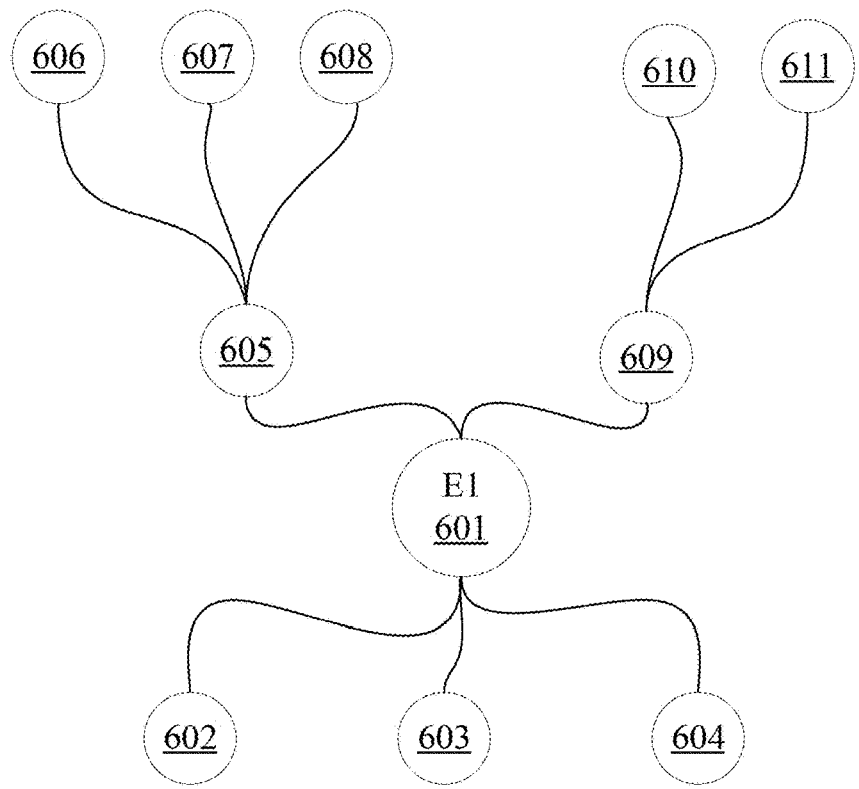
FIG. 6A is a diagram illustrating an example embodiment of graph-based modeling of enterprise risk, in accordance with some aspects of the systems and methods herein.
Figure 6B:
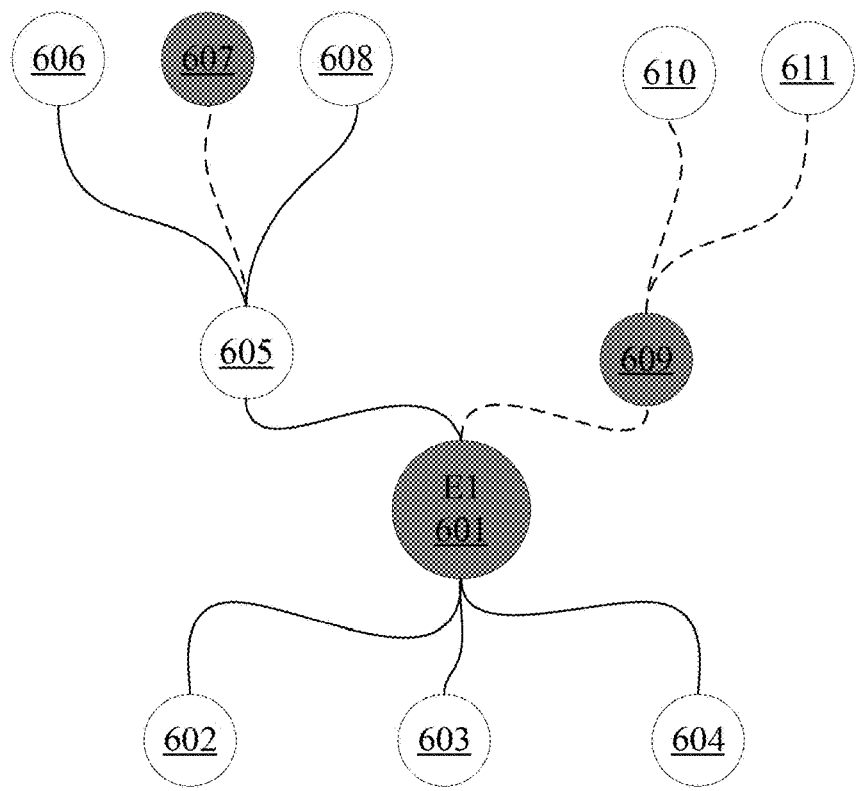
FIG. 6B is an additional diagram illustrating an example embodiment of graph-based modeling of enterprise risk, in accordance with some aspects of the systems and methods herein.
Figure 6C:
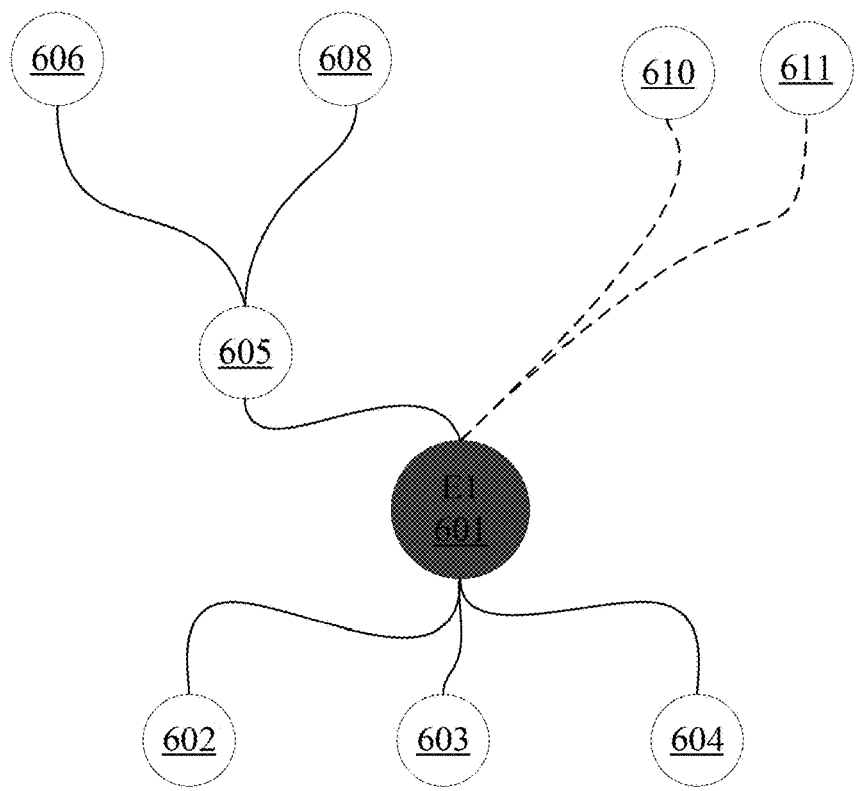
FIG. 6C is an additional diagram illustrating an example embodiment of graph-based modeling of enterprise risk, in accordance with some aspects of the systems and methods herein.

FIG. 6A, FIG. 6B, and FIG. 6C illustrate the graph-based modeling of enterprise risk as it evolves over time, in accordance with some aspects of the systems and methods herein.

FIG. 6A is a diagram illustrating an example embodiment of graph-based modeling of enterprise risk, in accordance with some aspects of the systems and methods herein. In the example, enterprise graph 600 comprises an employee node (E1) 601 and entity nodes 602-611. Each node 601-611 represents an employee or enterprise entity including location, compensation, and project. Employee E1 601 has relationships with entities 602-611, which may include, e.g., her team members, manager, project, etc. By observing this enterprise graph over time and comparing the enterprise graph evolution with historical data, employee attrition risk may be modeled.

FIG. 6B is an additional diagram illustrating an example embodiment of graph-based modeling of enterprise risk, in accordance with some aspects of the systems and methods herein. The diagram shows the enterprise graph with increased risk and weakened ties between entities.

Employee E1 601 is shown as a darkened node to represent increased attrition risk. Nodes 607 and 609 are also darkened to represent weakened ties between the entities, which results in the increased employee attrition risk of employee E1 601.

FIG. 6C is an additional diagram illustrating an example embodiment of graph-based modeling of enterprise risk, in accordance with some aspects of the systems and methods herein. The diagram shows the enterprise graph with a much higher employee attrition risk. Nodes 607 and 609 have been removed from the graph, which may further weaken the ties with nodes as is the case with nodes 610 and 611, or may completely break the ties with nodes as is the case with the tie to node 607. Employee E1 601 is shown, darkened even further from that of node E1 601 in FIG. 6B.

Figure 7:
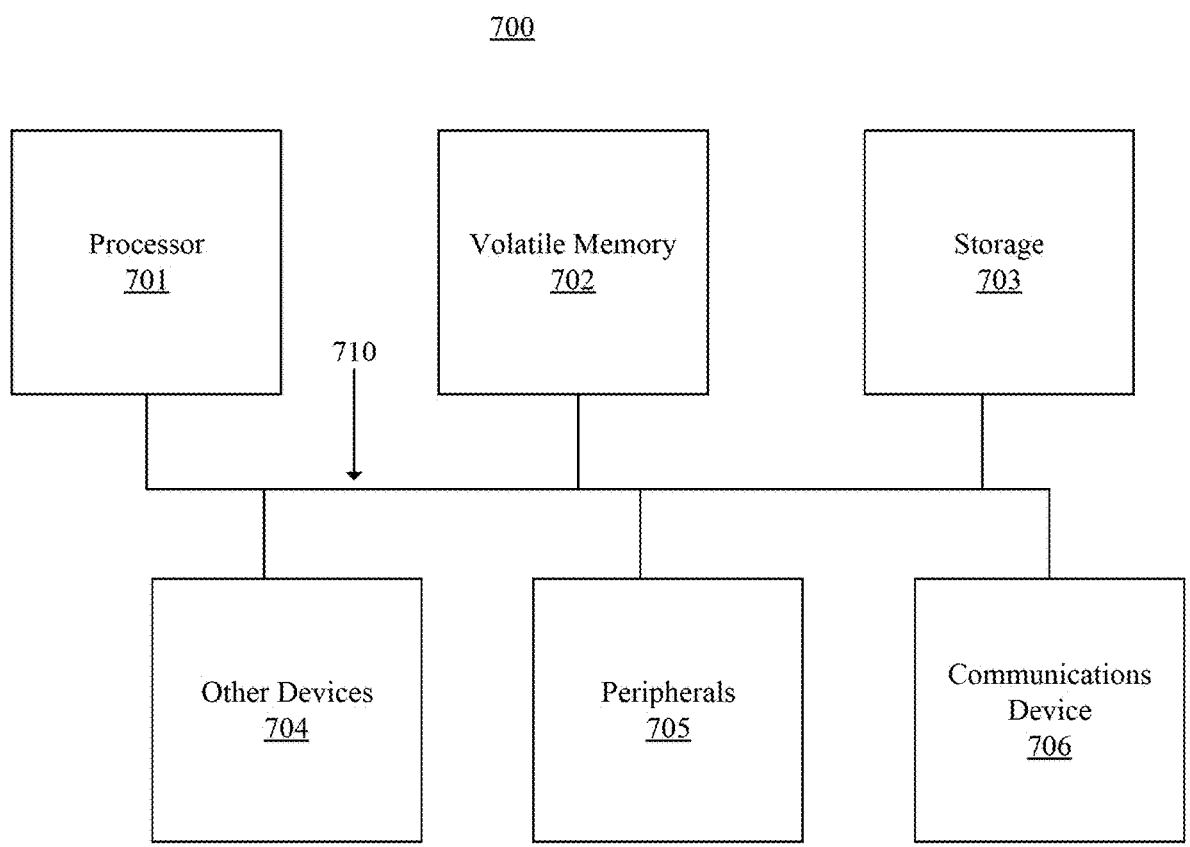
FIG. 7 is a diagram illustrating an exemplary computer that may perform processing in some embodiments.

FIG. 7 is a diagram illustrating an exemplary computer that may perform processing in some embodiments. Exemplary computer 700 may perform operations consistent with some embodiments. The architecture of computer 700 is exemplary. Computers can be implemented in a variety of other ways. A wide variety of computers can be used in accordance with the embodiments herein.

Processor 701 may perform computing functions such as running computer programs. The volatile memory 702 may provide temporary storage of data for the processor 701. RAM is one kind of volatile memory. Volatile memory typically requires power to maintain its stored information. Storage 703 provides computer storage for data, instructions, and/or arbitrary information. Non-volatile memory, which can preserve data even when not powered and including disks and flash memory, is an example of storage. Storage 703 may be organized as a file system, database, or in other ways. Data, instructions, and information may be loaded from storage 703 into volatile memory 702 for processing by the processor 701.

The computer 700 may include peripherals 705. Peripherals 705 may include input peripherals such as a keyboard, mouse, trackball, video camera, microphone, and other input devices. Peripherals 705 may also include output devices such as a display. Peripherals 705 may include removable media devices such as CD-R and DVD-R recorders/players. Communications device 706 may connect the computer 100 to an external medium. For example, communications device 706 may take the form of a network adapter that provides communications to a network. A computer 700 may also include a variety of other devices 704. The various components of the computer 700 may be connected by a connection medium 710 such as a bus, crossbar, or network.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed is:

1. A computer-implemented method for providing a prediction of employee attrition within an enterprise, comprising:
   connecting to one or more internal data sources within the enterprise and one or more external data sources outside of the enterprise;
   receiving a plurality of internal feed data from the internal data sources and external feed data from the external data sources, the internal feed data relating to a plurality of entities within the enterprise, wherein the plurality of entities comprises at least one or more employees of the enterprise;
   converting the plurality of internal feed data into normalized feed data within a single format;
   generating a plurality of enterprise graphs based on the normalized feed data, wherein each enterprise graph represents relationships between entities within the enterprise at a point in time;
   generating, by a risk assessment model related to changes in the enterprise graphs over time, one or more attrition probabilities for at least a subset of the one or more employees of the enterprise, wherein the risk assessment model is a machine learning model that is iteratively trained based on generated attrition probabilities adjusted with respect to the external feed data and the enterprise graphs;
   providing to one or more enterprise users, the one or more attrition probabilities for at least a subset of the one or more employees of the enterprise, wherein the attrition probabilities and the enterprise graphs are used as training data for generating one or more additional risk assessment models;
   generating one or more alerts related to the attrition probabilities, wherein the alerts comprise a priority classification related to the attrition of one or more employees; and
   providing the one or more alerts to one or more enterprise users.

2. The method of claim 1, wherein generating the risk assessment model comprises comparing the changes in the enterprise graphs over time to historical data relating to one or more historical changes in previous enterprise graphs.

3. The method of claim 1, further comprising:
   identifying one or more dimensions from the entities and the relationships between the entities;
   classifying each of the one or more dimensions into a predefined set of labels; and
   ranking the one or more labeled dimensions according to their effect on the attrition probability of the subset of the one or more employees.

4. The method of claim 3, further comprising:
   generating, using at least the risk assessment model and the one or more attrition probabilities, one or more explanations related to potential causes of probable employee attrition.

5. The method of claim 4, wherein the explanations comprise one or more suggested target actions for the enterprise to prevent or mitigate the probable attrition.

6. The method of claim 1, wherein at least one of the attrition probabilities is associated with a group comprising a plurality of employees.

7. The method of claim 1, further comprising:
   placing a monitoring status on an employee based on an attrition probability associated with the employee; and
   sending one or more monitoring alerts associated with the employee based on the monitoring status and one or more triggering events associated with the employee.

8. The method of claim 1, further comprising:
   receiving additional feed data;
   converting the additional feed data into additional normalized feed data; and optimizing the risk assessment model to generate one or more additional attrition probabilities based at least on the additional normalized feed data.

9. A non-transitory computer-readable medium comprising instructions for:

connecting to one or more internal data sources within the enterprise and one or more external data sources outside of the enterprise;

receiving a plurality of internal feed data from the internal data sources and external feed data from the external data sources, the internal feed data relating to a plurality of entities within the enterprise, wherein the plurality of entities comprises at least one or more employees of the enterprise;

converting the plurality of internal feed data into normalized feed data within a single format;

generating a plurality of enterprise graphs based on the normalized feed data, wherein each enterprise graph represents relationships between entities within the enterprise at a point in time;

generating, by a risk assessment model related to changes in the enterprise graphs over time, one or more attrition probabilities for at least a subset of the one or more employees of the enterprise, wherein the risk assessment model is a machine learning model that is iteratively trained based on generated attrition probabilities adjusted with respect to the external feed data and the enterprise graphs;

providing to one or more enterprise users, the one or more attrition probabilities for at least a subset of the one or more employees of the enterprise, wherein the attrition probabilities and the enterprise graphs are used as training data for generating one or more additional risk assessment models;

generating one or more alerts related to the attrition probabilities, wherein the alerts comprise a priority classification related to the attrition of one or more employees; and providing the one or more alerts to one or more enterprise users.

10. The non-transitory computer-readable medium of claim 9, wherein generating the risk assessment model comprises comparing the changes in the enterprise graphs over time to historical data relating to one or more historical changes in previous enterprise graphs.

11. The non-transitory computer-readable medium of claim 9, further comprising instructions for:

identifying one or more dimensions from the entities and the relationships between the entities;

classifying each of the one or more dimensions into a predefined set of labels; and ranking the one or more labeled dimensions according to their effect on the attrition probability of the subset of the one or more employees.

12. The non-transitory computer-readable medium of claim 11, the instructions further comprising:

generating, using at least the risk assessment model and the one or more attrition probabilities, one or more explanations related to potential causes of probable employee attrition.

13. The non-transitory computer-readable medium of claim 12, wherein the explanations comprise one or more suggested target actions for the enterprise to prevent or mitigate the probable attrition.

14. The non-transitory computer-readable medium of claim 9, wherein at least one of the attrition probabilities is associated with a group comprising a plurality of employees.

15. The non-transitory computer-readable medium of claim 9, the instructions further comprising:

placing a monitoring status on an employee based on an attrition probability associated with the employee; and sending one or more monitoring alerts associated with the employee based on the monitoring status and one or more triggering events associated with the employee.

16. The non-transitory computer-readable medium of claim 9, the instructions further comprising:

receiving additional feed data;

converting the additional feed data into normalized feed data; and optimizing the risk assessment model to generate one or more additional attrition probabilities based at least on the normalized feed data.

* * * * *